(12) United States Patent
Calhoun

(10) Patent No.: US 7,643,442 B1
(45) Date of Patent: *Jan. 5, 2010

(54) DYNAMIC QOS CONFIGURATION BASED ON TRANSPARENT PROCESSING OF SESSION INITIATION MESSAGES

(75) Inventor: Patrice R. Calhoun, Pleasanton, CA (US)

(73) Assignee: Cisco Systems, Inc., San Jose, CA (US)

( * ) Notice: Subject to any disclaimer, the term of this patent is extended or adjusted under 35 U.S.C. 154(b) by 1211 days.

This patent is subject to a terminal disclaimer.

(21) Appl. No.: 10/611,521

(22) Filed: Jun. 30, 2003

(51) Int. Cl.
*H04W 4/00* (2009.01)
(52) U.S. Cl. ..................... 370/328; 370/338
(58) Field of Classification Search ............... 370/980, 370/338
See application file for complete search history.

(56) References Cited

U.S. PATENT DOCUMENTS

| | | | |
|---|---|---|---|
| 5,684,860 A | 11/1997 | Milani et al. | |
| 6,760,318 B1 | 7/2004 | Bims | |
| 6,788,658 B1 | 9/2004 | Bims | |
| 6,925,070 B2 | 8/2005 | Proctor, Jr. | |
| 7,212,837 B1 | 5/2007 | Calhoun et al. | |
| 7,298,702 B1 * | 11/2007 | Jones et al. | 370/235 |
| 2002/0075844 A1 * | 6/2002 | Hagen | 370/351 |
| 2002/0114282 A1 * | 8/2002 | MeLampy et al. | 370/238 |
| 2002/0133600 A1 * | 9/2002 | Williams et al. | 709/228 |
| 2002/0152319 A1 * | 10/2002 | Amin et al. | 709/232 |
| 2002/0188723 A1 | 12/2002 | Choi | |
| 2003/0023746 A1 | 1/2003 | Loguinov | |
| 2003/0074452 A1 * | 4/2003 | Zheng et al. | 709/228 |
| 2003/0188006 A1 | 10/2003 | Bard | |
| 2003/0198208 A1 | 10/2003 | Koos, Jr. et al. | |
| 2004/0260750 A1 * | 12/2004 | Ruutu et al. | 709/200 |
| 2005/0053070 A1 * | 3/2005 | Jouppi | 370/395.3 |
| 2005/0286466 A1 * | 12/2005 | Tagg et al. | 370/329 |
| 2006/0120282 A1 * | 6/2006 | Carlson et al. | 370/229 |
| 2006/0230124 A1 * | 10/2006 | Belfiore et al. | 709/219 |
| 2007/0076603 A1 * | 4/2007 | MeLampy et al. | 370/229 |

OTHER PUBLICATIONS

International Standard, ISO/IEC 8802-11 ANSI/IEEE Std. 802.11, 1999 Edition, Part II: Wireless LAN Medium Access Control (MAC) and Physical Layer (PHY) specifications, pp. 122-137.
"tcp-masq" Internet citation http://speed.cis.nctu.edu.tw/bandwidth/opensource/, Daa Sheet Cisco Aironet 1200 Series Access Point, pp. 1-13, posted Mar. 11, 2002.

* cited by examiner

*Primary Examiner*—Seema S. Rao
*Assistant Examiner*—Sai-Ming Chan
(74) *Attorney, Agent, or Firm*—Baker Botts L.L.P.

(57) ABSTRACT

Methods, apparatuses and systems directed to the dynamic configuration of QoS policy for sessions in wireless network environments. Certain embodiments of the present invention feature the transparent processing of session initiation messages associated with wireless clients and the dynamic configuration of QoS policy for the wireless clients having no QoS configuration mechanism. In certain embodiments, the dynamic QoS configuration mechanism is transparent to the wireless clients, requiring no QoS functionality to reside on the wireless clients. Certain embodiments of the present invention transparently process SIP messages to dynamically configure QoS policy for the resulting sessions. As discussed below, the dynamic QoS configuration functionality described herein can be applied to a variety of wireless network system architectures.

16 Claims, 7 Drawing Sheets

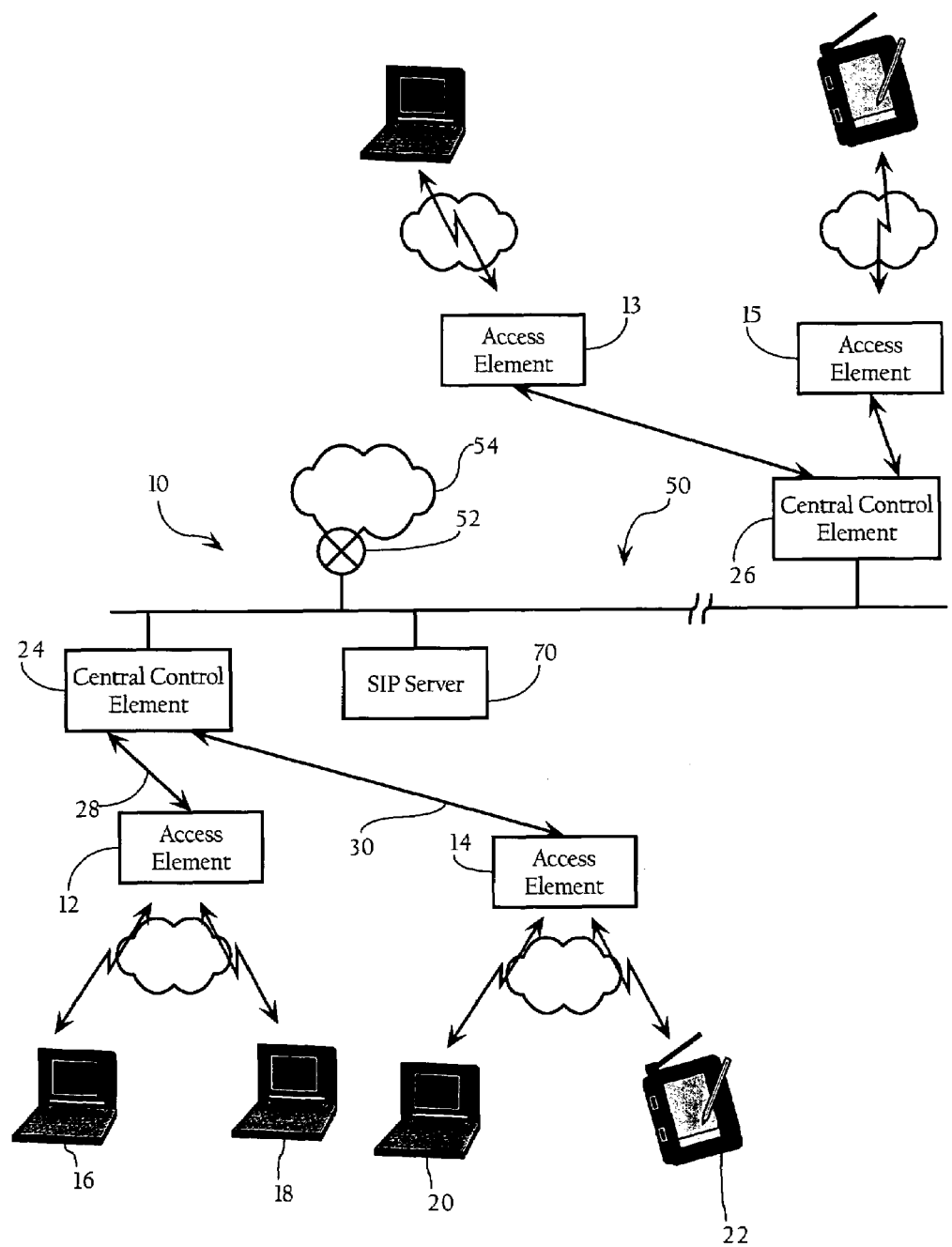
Fig._1

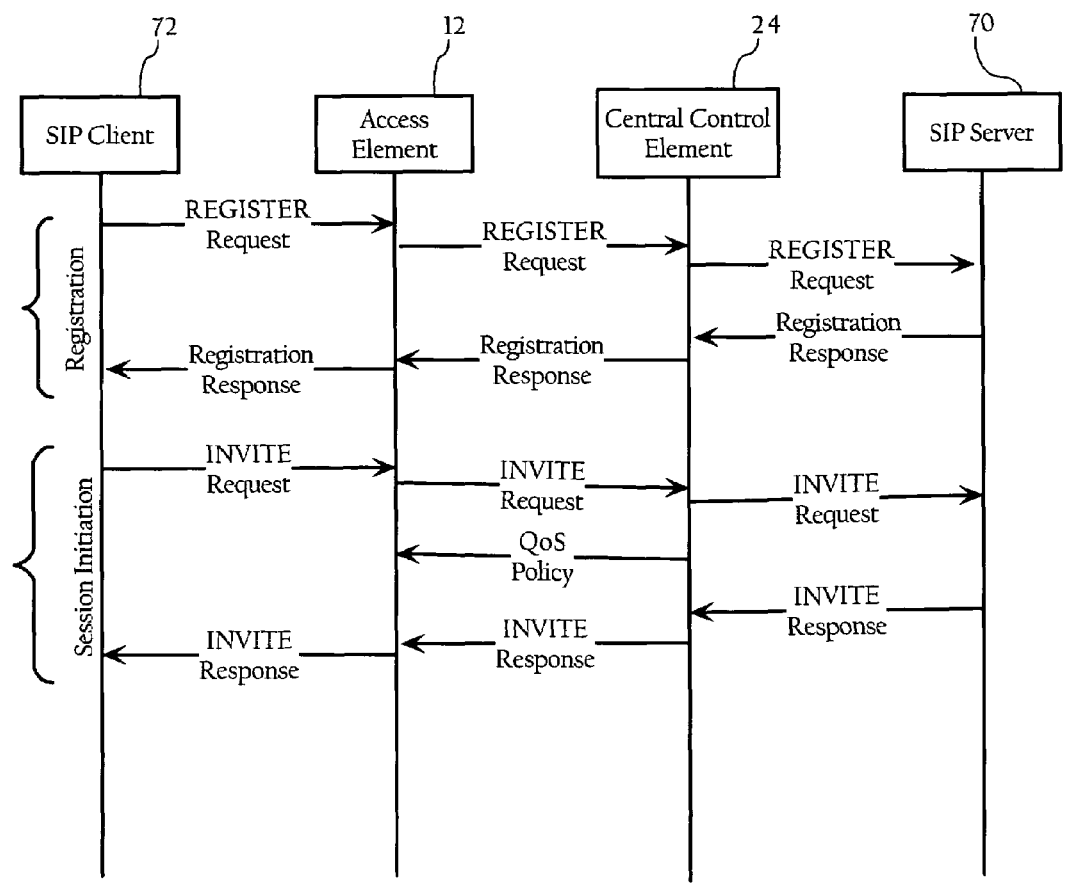
Fig._2

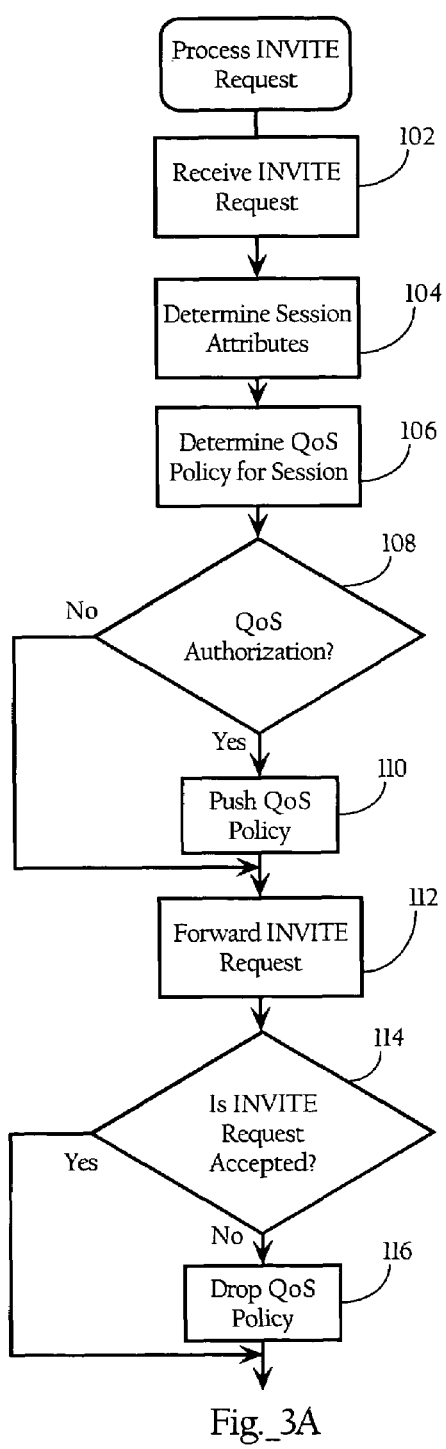
Fig._3A
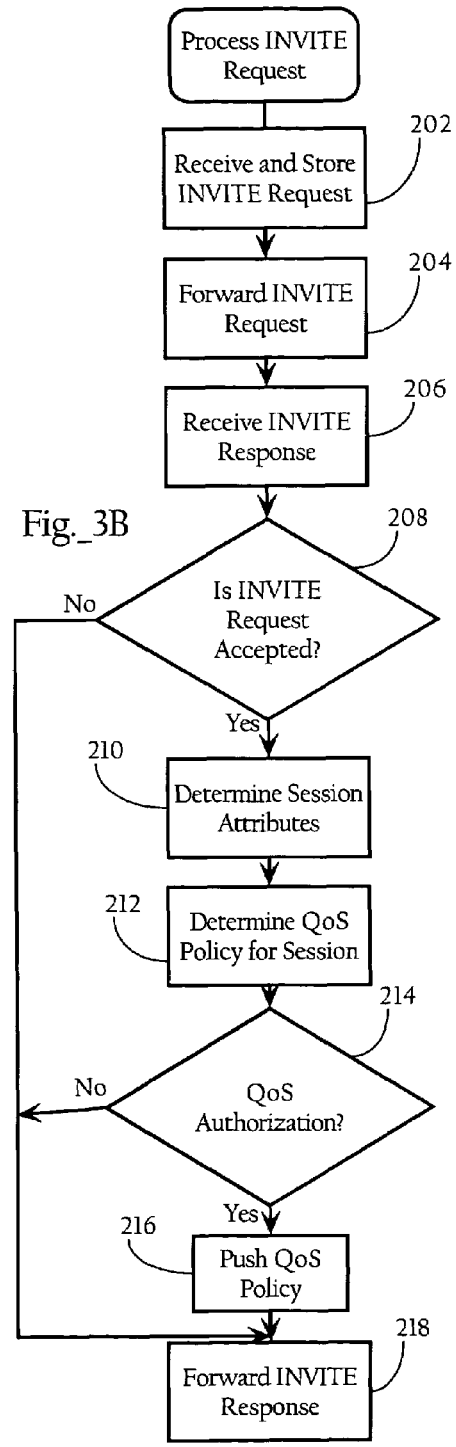
Fig._3B

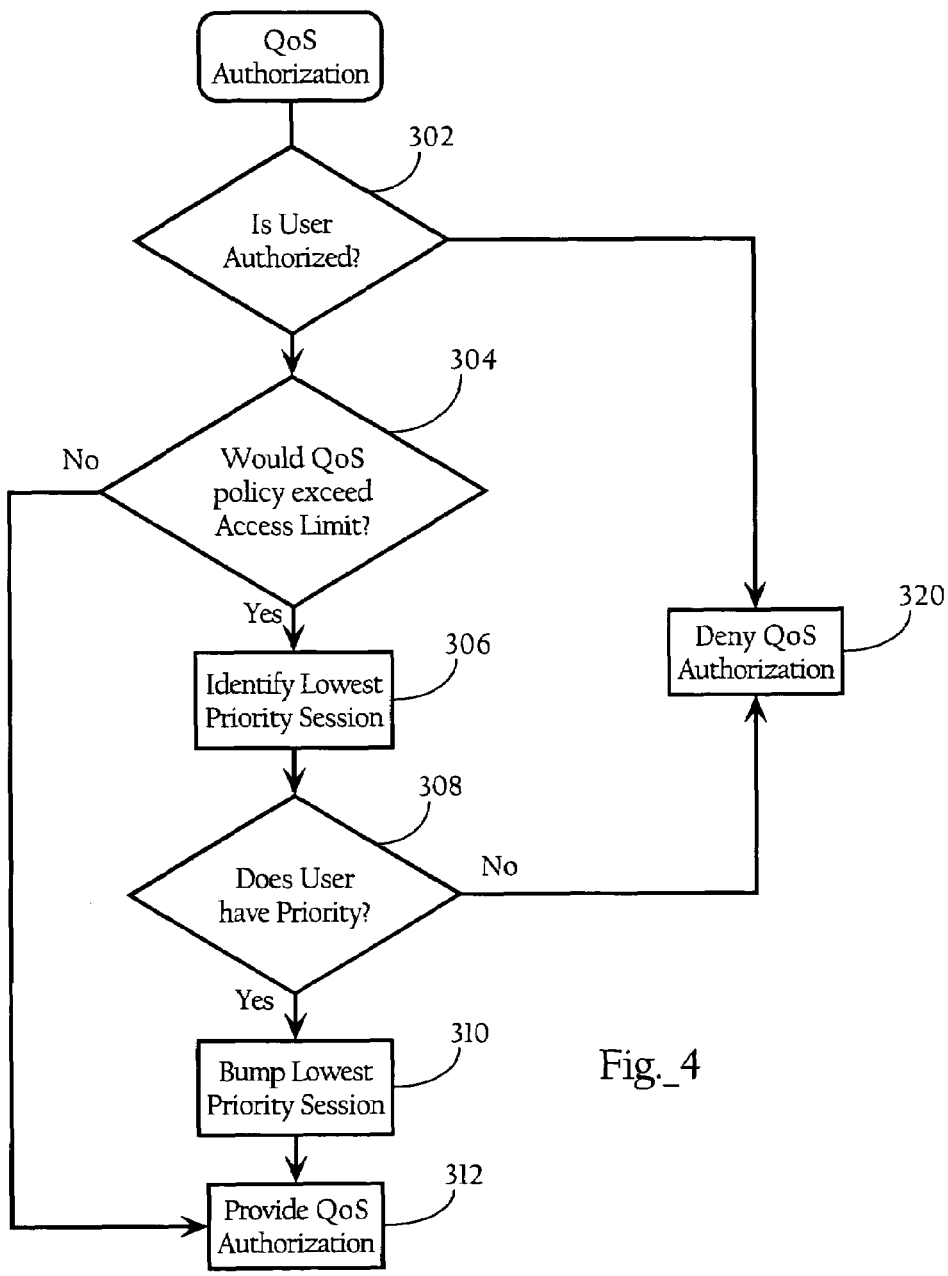
Fig._4

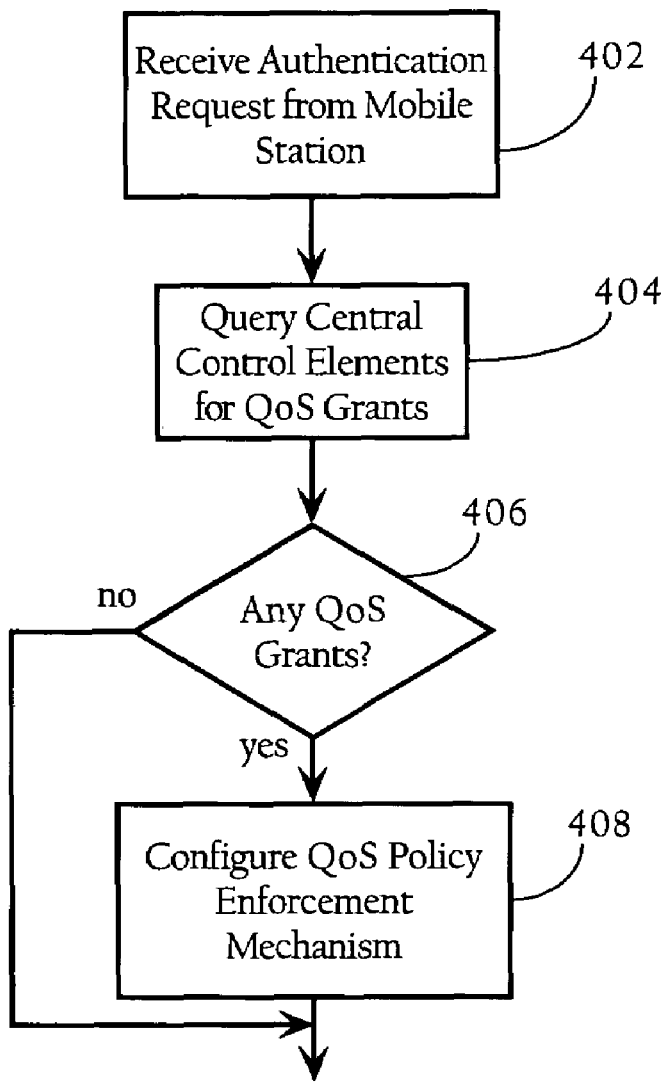
Fig._5

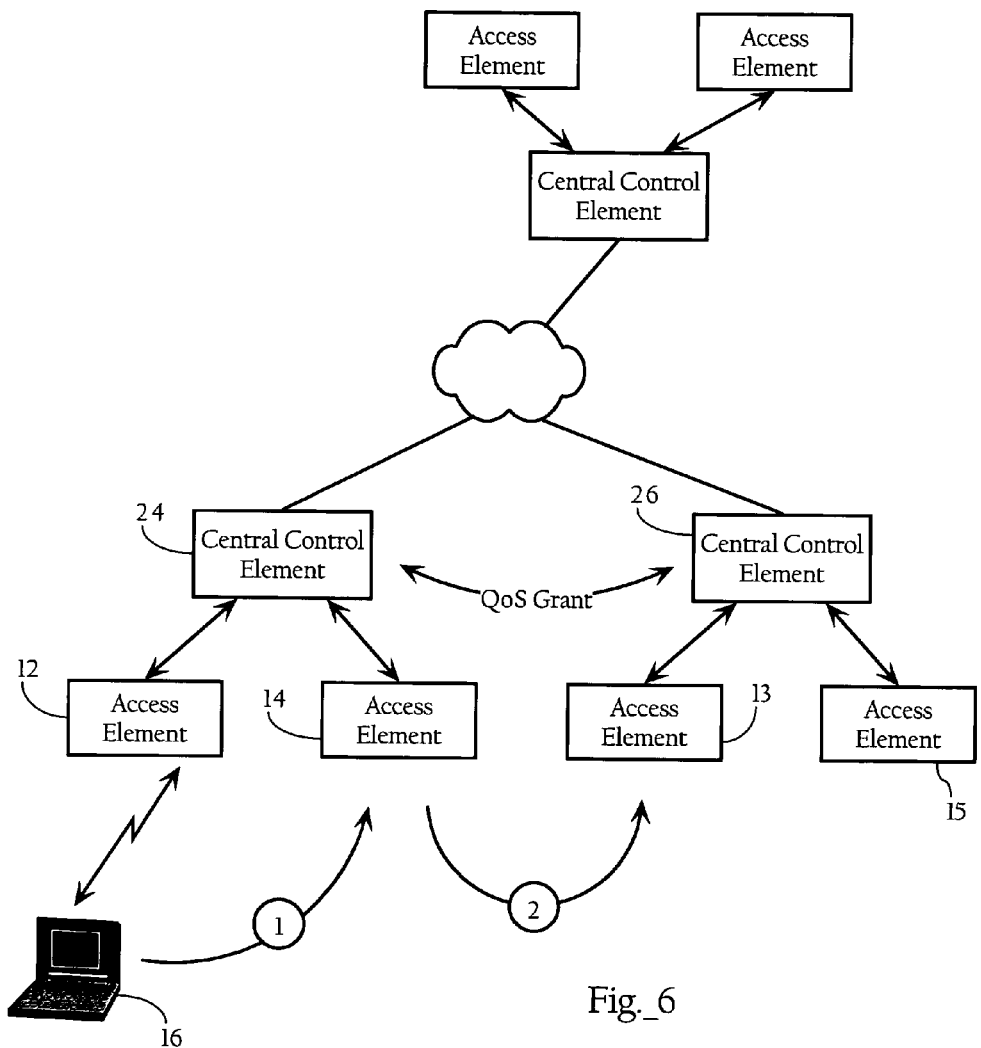
Fig._6

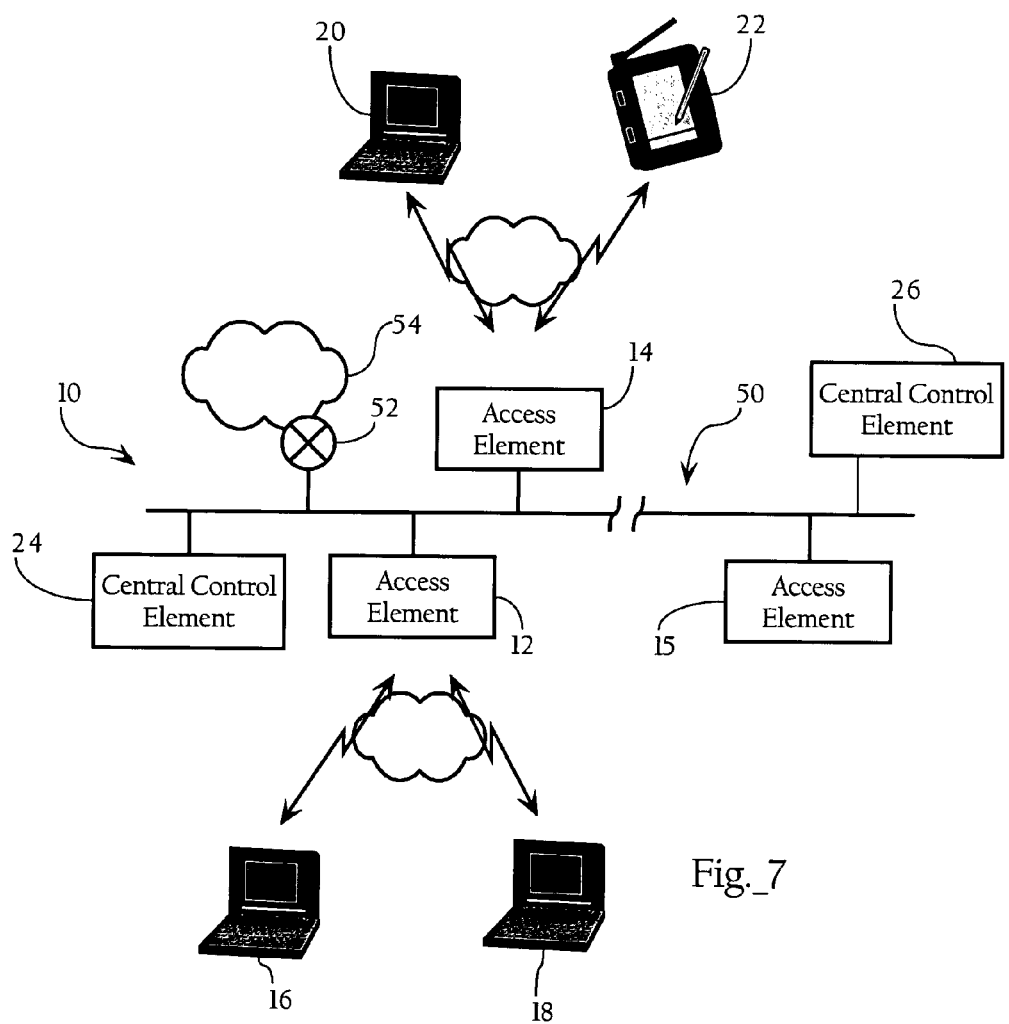
Fig._7

DYNAMIC QOS CONFIGURATION BASED ON TRANSPARENT PROCESSING OF SESSION INITIATION MESSAGES

CROSS-REFERENCE TO RELATED APPLICATIONS

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/407,346 in the name of Patrice R. Calhoun, entitled "Distributed Wireless Network Security System;" and U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN."

FIELD OF THE INVENTION

The present invention relates to wireless computer networks and, more particularly, to a dynamic Quality-of-Service (QoS) configuration mechanism for wireless network environments based on transparent processing of session initiation messages transmitted over a wireless medium.

BACKGROUND OF THE INVENTION

Market adoption of wireless LAN (WLAN) technology has exploded, as users from a wide range of backgrounds and vertical industries have brought this technology into their homes, offices, and increasingly into the public air space.

This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, the capabilities of wireless clients and the uses to which they are put increasingly expand. For example, certain wireless clients, such as laptops and even cell phones with WLAN capabilities, use wireless connections to access the wired computer network and make telephone calls, or engage in other interactive sessions involving multimedia elements, such as voice, video, graphics, and the like. Voice-over-IP (VoIP), for example, describes facilities for managing the delivery of voice information using the Internet Protocol (IP). In general, this means sending voice information in digital form in discrete packets rather than in the traditional circuit-switched protocols of the public switched telephone network. In addition to IP, VoIP uses the real-time protocol (RTP) to help ensure that packets get delivered in a timely way, and uses the Session Initiation Protocol (SIP) to set up the session implementing the call.

The Session Initiation Protocol (SIP) [IETF Request for Comments [RFC] 2543] is an Internet Engineering Task Force (IETF) standard protocol for initiating an interactive user session that involves multimedia elements such as video, voice, chat, gaming, and virtual reality. Like HTTP or SMTP, SIP works in the Application layer of the Open Systems Interconnection (OSI) communications model. SIP can establish multimedia sessions or Internet telephony calls, and modify, or terminate them. The protocol can also invite participants to unicast or multicast sessions. Because the SIP supports name mapping and redirection services, it makes it possible for users to initiate and receive communications and services from any location, and for networks to identify the users wherever they are.

SIP is based on the request-response paradigm, used to initiate sessions for internet telephony, instant messaging and any other interactive session involving the exchange of data or multimedia elements. To initiate a session, the caller (known as the User Agent Client, or UAC) sends a request (called an INVITE), addressed to the person the caller wants to talk to. In SIP, addresses are URLs. SIP defines a URL format that is very similar to the popular mailto URL. If the user's e-mail address is user@user-domain.com, their SIP URL would be sip:user@user-domain.com. Telephone numbers, mapped to SIP addresses, can also be used. In some systems, this message is not sent directly to the called party, but rather to an entity known as a proxy server. The proxy server is responsible for routing and delivering messages to the called party. The called party then sends a response, accepting or rejecting the invitation, which is forwarded back through the same set of proxies, in reverse order. A proxy can receive a single INVITE request, and send out more than one INVITE request to different addresses. This feature, aptly called "forking," allows a session initiation attempt to reach multiple locations, in the hopes of finding the desired user at one of them.

The proxy for the called party generally forwards the INVITE to the end system at which the user is currently stationed. SIP REGISTER request and associated functionality provides the proxy an address binding. For example, when a user initiates a SIP client on an end system such as a cell phone, PDA, or laptop, the SIP client registers the binding sip:user@user-domain.com to sip:user@mypda.userpda.com. This allows the proxy to know that the user is actually at mypda, a specific host on the network, connected via a wireless network system. The proxy consults this registration database, and forwards the INVITE to user@mypda.userpda.com. The response is forwarded back through the proxies to the calling user. An acknowledgement is sent.

One problem for VoIP and other sessions requiring real-time or near real time service is the issue of Quality of Service (QoS). The delay in conversations that many VoIP users encounter is caused by the jitter and latency of packet delivery within the Internet itself. SIP itself does not allow for reservation of network resources or admission control. Accordingly, SIP relies on other protocols and techniques in order to provide quality of service. To create QoS on the Internet, different classes of service for packets are applied. The IETF has taken two approaches: The first is Integrated Services (RFC 2211 and RFC 2212), also known as INTSERV. The second is Differentiated Services (RFC 2475), or DIFFSERV.

While the prior art addresses QoS for RTP and other real-time traffic over open computer networks, the prior art does not provide a dynamic QoS configuration mechanism for clients in wireless network environments. Accordingly, while QoS may be applied to the packets associated with a call session over a wired computer network, the wireless network systems to which one or both end systems may be connected provide no mechanism for configuring QoS policy for the call session. The prior art also does not provide any mechanism that dynamically responds to situations where the wireless client is handed off to another access point, such as when the user walks into a different coverage area. Embodiments of the present invention substantially fulfill these needs.

SUMMARY OF THE INVENTION

The present invention provides methods, apparatuses and systems directed to the dynamic configuration of QoS policy for sessions in wireless network environments. Certain embodiments of the present invention feature the transparent processing of session initiation messages associated with wireless clients and the dynamic configuration of QoS policy for the wireless clients having no QoS configuration mechanism. In certain embodiments, the dynamic QoS configuration mechanism is transparent to the wireless clients, requiring no QoS functionality to reside on the wireless clients. Certain embodiments of the present invention transparently process SIP messages to dynamically configure QoS policy for the resulting sessions. As discussed below, the dynamic QoS configuration functionality described herein can be applied to a variety of wireless network system architectures.

DESCRIPTION OF THE DRAWINGS

FIG. 1 is a functional block diagram illustrating a wireless network system according to an embodiment of the present invention.

FIG. 2 is a diagram illustrating message flows associated with SIP REGISTRATION and INVITE messages.

FIG. 3A is a flow chart diagram providing a method, according to an embodiment of the present invention, directed to the transparent processing of session initiation messages.

FIG. 3B is a flow chart diagram providing an alternative method for transparent processing of session initiation messages.

FIG. 4 is a flow chart diagram setting forth a method, according to an embodiment of the present invention, directed to authorizing the application of QoS policy to a session.

FIG. 5 is a flow chart diagram showing a method involving the exchange of QoS grants between central control elements in a wireless network system.

FIG. 6 is a functional block diagram illustrating the exchange of QoS grants between central control elements in a wireless network system FIG. 7 is a functional block diagram illustrating an alternative wireless network system architecture in which the present invention may operate.

DESCRIPTION OF PREFERRED EMBODIMENT(S)

For didactic purposes an embodiment of the present invention is described as operating in a WLAN environment as disclosed in U.S. application Ser. Nos. 10/155,938 and 10/407,357 incorporated by reference herein. As discussed below, however, the present invention can be implemented according to a vast array of embodiments, and can be applied to a variety of WLAN architectures.

FIG. 1 illustrates a wireless computer network environment according to an embodiment of the present invention. Referring to FIG. 1, there is shown a block diagram of a wireless Local Area Network system 10 according to an embodiment of the invention. A specific embodiment of the invention includes the following elements: access elements 12, 14 for wireless communication with selected client remote elements 16, 18, 20, 22, central control elements 24, 25, 26, and means for communication between the access elements and the central control elements, typically direct line access 28, 30, but potentially a wireless backbone, fiber or other reliable link. As disclosed in U.S. patent application Ser. No. 10/407,357, in another embodiment, the access elements, such as access elements 12, 14 are directly connected to LAN 10 or a virtual local area network (VLAN) for communication with a corresponding central control element 24, 26. See FIG. 7.

The access elements 12-15 are coupled via communication means using a wireless local area network (WLAN) protocol (e.g., IEEE 802.11a or 802.11b, etc.) to the client remote elements 16, 18, 20, 22. The communications means 28, 30 between the access elements 12, 14 and the central control element 24 is typically an Ethernet network, but it could be anything else which is appropriate to the environment. As described in U.S. application Ser. No. 10/155,938, the access elements 12, 14 and the central control element 24 tunnel network traffic associated with corresponding remote client elements 16, 18; 20, 22 via direct access lines 28 and 30, respectively. Central control element 24 is also operative to bridge the network traffic between the remote client elements 16, 18; 20, 22 transmitted through the tunnel with corresponding access elements 12, 14.

As described in the above-identified patent application, central control element 24 operates to perform data link layer management functions, such as authentication and association on behalf of access elements 12, 14. For example, the central control element 24 provides processing to dynamically configure a wireless Local Area Network of a system according to the invention while the access elements 12, 14 provide the acknowledgment of communications with the client remote elements 16, 18, 20, 22. The central control element 24 may for example process the wireless LAN management messages passed on from the client remote elements 16, 18; 20, 22 via the access elements 12, 14, such as authentication requests and authorization requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, and interference or noise. Central control elements 25, 26 and associated access elements 13, 15 operate in a similar or identical manner. Other system architectures are possible. For example, U.S. application Ser. No. 10/407,357 discloses a system architecture where the access elements, such as access elements 12-15, are directly connected to LAN segment 10.

SIP server 70 in one embodiment is a computing device hosting functionality for facilitating the initiation of sessions between two end-systems. In one embodiment, SIP server 70 includes authentication mechanisms to identify and authenticate users to allow or deny access to the session initiation functionality. In one embodiment, SIP server 70 includes or is operably connected to a user database storing user names in association with corresponding passwords to allow for authentication of users based on password. SIP server 70 includes registration and session initiation functionality. Registration functionality allows users to register with SIP server 70 to allow incoming session requests to be connected with the user. Session initiation functionality allows the user to initiate sessions with one or more end systems. Remote client elements 16, 18, 20, 22 include a SIP client operative to interact with SIP server 70. In one embodiment, the SIP server 70 and the SIP clients implement the Session Initiation Protocol (SIP), initially specified in IETF RFC 2543. One skilled in the art will recognize that other suitable session initiation protocols (where QoS requirements are not implemented), such as H.323. In one embodiment, the remote client elements 16, 18, 20, 22 include an application that interacts with remote client elements by exchanging data or multimedia elements over a computer network. For example, the remote client elements 16, 18, 20, 22 may include a telephony application that uses the SIP client residing on each remote client element to establish the session during which voice data, or voice and video data, are exchanged between remote client elements.

As discussed herein, the access elements 12-15 in combination with their respective central controllers 24, 26 include QoS functionality operative to provide wireless service to remote client elements at given QoS levels. For example, access element 12 in connection with central controller 24, for example, can provide a guaranteed amount of bandwidth to remote client element 18. Other QoS parameters can include jitter, latency, response time, and the like. In one embodiment, the access elements 12-15 and central controllers 24, 26 support the draft IEEE 802.11e standard, incorporated by reference herein, describing implementation of QoS in wireless network environments. As one skilled in the art will recognize, however, any suitable QoS functionality operating in a wireless network can be used as the present invention is directed to the configuration of the QoS mechanism for particular sessions, as opposed to the QoS mechanism itself. The wireless network system can also apply QoS tagging (such as IEEE 802.1P) when bridging network traffic between the wired network and the remote client elements.

As discussed in more detail below, central control elements 24, 26 intercept and transparently process SIP messages exchanged between SIP clients and a SIP server to dynamically configure the QoS mechanisms implemented by the wireless network system. FIG. 2 illustrates the message flow, according to an embodiment of the present invention, between a SIP client 72 and SIP server 70. As FIG. 2 illustrates, when SIP client 72 transmits a REGISTER request to register with SIP Server 70, access element 12, as discussed above, receives the wireless frames embodying the REGISTER request and tunnels them to central control element 24, which forwards the REGISTER request to SIP server 70. SIP Server 70 receives and processes the request, and transmits a registration response, which again is ultimately transmitted to SIP client 72. In one embodiment, SIP server 70 includes an authentication mechanism that controls access to registration with SIP server 70 and, therefore, use of the session initiation functionality associated with the SIP server. For example, the SIP server 70 may verify a digital signature or other credential appended to the REGISTRATION request in an authentication header. Other authentication mechanisms and protocols are possible. For example, SIP server 70 may transmit an explicit authentication challenge to SIP client 72 directing the user to enter a password or other response. Assuming the challenge response is valid, SIP server 70 registers the user and transmits the registration response granting access to the session initiation functionality of SIP server 70. As discussed in U.S. patent application Ser. No. 10/407,346, central control element 24 can monitor the authentication messages to determine whether the user has been properly authenticated and, apply security policies to block the remote client element on which SIP client 72 is implemented, if it fails to authenticate. For example, if SIP client 72 fails to authenticate after a threshold number of times, central control element 24 can direct access element 12 to terminate the wireless connection with the remote client element and place the remote client element on a blacklist that prevents it from authenticating and/or associating with the access element 12 or other access elements. As discussed in U.S. application Ser. No. 10/407, 346, policy for the Layer 2 security mechanism is configured based on monitoring a security/authentication mechanism (here, a SIP authentication server) operating at a higher layer.

According to SIP, a SIP client transmits an INVITE request (either to a SIP server 70 acting as a proxy, a remote proxy associated with the destination end system, or directly to the end system itself to initiate a session. In the embodiment shown in FIG. 2, however, SIP server 70 acts as a proxy server during session initiation. As with the REGISTER request, central control element 24 is in the position to detect and intercept the SIP request and transparently process the request to specify QoS parameters, if any, to be applied to the session initiated by the INVITE request. As discussed more fully below, as FIG. 2 shows, central control element 24, in one embodiment, processes the INVITE request to determine a QoS policy to be applied to the corresponding session and pushes the QoS policy to access element 12. As FIG. 2 illustrate, SIP server 70, acting as a proxy, receives the INVITE response, accepting or rejecting the INVITE request and forwards it to SIP client 72. Assuming the INVITE request initiates a session, access element 12 and central control element 24 can then apply the QoS policy, if any was specified, to the ensuing session. If the INVITE request is rejected, the QoS policy parameters are discarded by access element 12 and central control element 24.

FIGS. 3A and 3B provide two alternative methods for processing INVITE requests and responses. As FIG. 3A shows, in one embodiment, when central control element 24 receives an INVITE request (102), it determines the attributes of the requested session (104). For example, the central control element 24 inspects the INVITE request to determine the MAC address of the remote client element, the IP address of the target end system, the protocol(s) employed (e.g., UDP, TCP, etc.), port numbers, potentially other session attributes (such as the functionality/capabilities of the remote client element, etc.), and any requirements for the requested session. For example, if the requested session is a VoIP session, the INVITE request may include a CODEC identifier and specify bandwidth, latency and/or jitter requirements for the session. Central control element 24 then determines the QoS policy for the session (106), based, in one embodiment, on the previously identified session attributes, such as the session requirements and/or the identified protocols, etc. Central control element 24, in one embodiment, then determines whether application of the computed QoS policies are authorized (108).

As FIG. 4 demonstrates, QoS authorization can be based on a variety of factors or combinations of factors. For example, in one embodiment, a QoS policy scheme may be configured such that only a select set of users (identified in one embodiment, by wireless MAC address) are entitled to receive QoS guarantees (302). In another embodiment, a policy scheme can be configured where different sets of users are entitled to different levels of QoS guarantees. Authorization can also be based on the number of concurrently active sessions with which the user is associated. In addition, since the access to the wireless medium is a limited resource, central control element 24, in one embodiment, further decides if granting the QoS policies for the user would require bumping another user session. For example, central control element 24 determines whether application of the QoS policy to the requested session would exceed certain configured limits, or the capacity of the access element 12, to provide QoS guarantees to the existing sessions (304). If so, central control element identifies the lowest priority session (306) and determines whether the requested session has priority over it (308).

If so, the lowest priority session is bumped (310) and, in one embodiment, relegated to best efforts service policies. If the user does not have priority, then QoS authorization is denied (320). Best efforts policies are then applied to any resulting session.

Returning to the method illustrated in FIG. 3A, if the QoS policy is authorized, central control element 24 pushes the QoS policy to access element 12 (110). In one embodiment, the QoS policy is pushed to the access element 12 in the form of a QoS Grant that includes: 1) the MAC address of the remote client element, 2) the IP address (and/or SIP address) of the target end system, 3) applicable protocols (e.g., TCP, UDP, etc.), 4) the port numbers associated with the session, and 5) at least one QoS policy (e.g., a minimum bandwidth guarantee, maximum latency guarantee, a maximum jitter guarantee, etc.). In one embodiment, the access element 12 and central control element 24 use the end system addresses and port numbers to identify and distinguish sessions for the purposes of applying QoS policy. In one embodiment, central control element 24 also stores the QoS Grant in memory.

As FIG. 3A illustrates, central control element 24 then forwards the INVITE request to SIP server 70 (112). When the INVITE response is detected, the central control element 24 determines whether it accepts the INVITE request (114). If the requested session is rejected, central control element drops the QoS Grant from memory and transmits control signals to the access element 12 to do the same (116). Otherwise, the QoS grant persists in memory and the QoS policies applied to the flows associated with the ensuing session. As discussed above, access element 12 and central control element 24 can apply any suitable mechanism for enforcing QoS policy, such as the functionality specified in the draft IEEE 802.11e specification.

FIG. 3B illustrates an alternative method for transparently processing SIP requests to dynamically configure QoS policies for a session. As FIG. 3B shows, central controller 24, in one embodiment, receives and stores the INVITE request (202) and forwards the request to SIP server 70 (204). When central control element 24 encounters the INVITE response (206), it determines whether the requested session was accepted (208). If so, central controller 24 examines the stored INVITE request and the response to determine session attributes, as discussed above (210) and determines QoS policy for the session (212). If the QoS policy is authorized (214), central control element 24 pushes the QoS policy to access element 12 (216) and forwards the INVITE response (218). Central control element 24, employing the QoS functionality specified in IEEE 802.11e, informs the wireless client that QoS has been granted via access element 12. As one skilled in the art will recognize, the present invention, in one embodiment, provides QoS guarantees to a wireless client executing a particular application without an explicit request for QoS from the client.

The system architecture disclosed in FIG. 1, as well as the system architecture disclosed in FIG. 7, also allows for QoS Grants to be distributed within the wireless network system as needed to maintain the QoS guarantees as the user associated with a remote client element moves between access elements. For example, as FIG. 6 illustrates, if remote client element 16 moves to a different coverage area and associates with access element 14 (Ref. No. 1), central control element 24 can simply push the QoS grant to access element 14 in response to an authentication request or subsequent authentication request transmitted by remote client element 16. If, however, the remote client element 16 associates with an access element not directly controlled by central control element 24 (Ref No. 2), central control element 26, in response to an authentication request tunneled by access element 13 (see FIG. 5, 402), queries other central control elements for QoS grants corresponding to the remote client element 16 (404). If any QoS grants are received (406), central control element 26 configures its QoS mechanism according to the parameters specified in the QoS grant (408). In one embodiment, central control element 26 determines anew whether the QoS grant is authorized (see FIG. 4), such as whether an existing session currently enjoying QoS guarantees should be bumped. One skilled in the art will appreciate that, without the QoS Grant transfer mechanism described herein, the wireless client would need to re-request QoS, by sending another SIP request, which would require the application executed on the wireless client to have knowledge of hand-offs between access points (which is typically not available).

The invention has been explained with reference to specific embodiments. Other embodiments will be evident to those of ordinary skill in the art. For example, the present invention can also be applied to WLAN architectures beyond the hierarchical WLAN architecture described above. For example, in another embodiment, the dynamic QoS configuration functionality described herein can be implemented within the context of wireless networks comprising a plurality of single, autonomous access points, which can be configured to intercept and process SIP or other session initiation protocol messages, and exchange QoS grants with other similarly configured access points. In addition, the present invention can be applied to other session initiation protocols beyond the Session Initiation Protocol (SIP) specified in IETF RFC 2543. Still further, the present invention has application to wireless technologies beyond the IEEE 802.11 protocol, such as Bluetooth® and Ultra-Wide Band wireless technologies. It is, therefore, intended that the claims set forth below not be limited to the embodiments described above.

What is claimed is:

1. A wireless network system, comprising
a plurality of access elements for wireless communication with one or more remote client elements and for communication with a central control element;
a central control element for supervising said access elements, wherein the central control element is operative to manage and control the wireless connections between the access elements and corresponding remote client elements,
wherein the central control element is further operative to
detect a session initiation message associated with a first remote client element, the session initiation message corresponding to an application layer session between the first remote client element and an end system,
process the session initiation message to determine one or more Quality-of-Service (QoS) parameters, wherein one of the one or more QoS parameters is an allocation of wireless bandwidth resources of an access element;
associate the one or more QoS parameters to the application layer session corresponding to the session initiation message, and
forward the session initiation message to a session initiation protocol server for processing of the session initiation message;
transmit the one or more QoS parameters to a first access element to which the first remote client element is associated, and
wherein the first access element is operative to
maintain wireless connections with one or more remote client elements;

reserve wireless bandwidth of the first access element for the application layer session according to the allocation of wireless bandwidth of the QoS parameter transmitted by the central control element.

2. The system of claim 1 further comprising a computer network, wherein the central control element is coupled to the computer network, and wherein the central control element is operative to establish a tunnel with each access element for transmission of wireless traffic associated with corresponding remote client elements, and bridge network traffic between the computer network and a remote client element through a tunnel with a corresponding access element.

3. The system of claim 2 wherein the access elements are each connected to the central control element via a direct access line.

4. The system of claim 2 wherein the access elements are each operably coupled to the computer network.

5. The system of claim 1 wherein the central control element, in response to the handoff of the remote client element from the first access element to a second access element, is further operative to transmit the QoS parameter defining the allocation of wireless bandwidth to the second access element.

6. The system of claim 1 wherein the central control element is further operative to revoke previously granted QoS guarantees provided to at least one lower priority session, if enforcement of the QoS parameter defining the allocation of wireless bandwidth with all previously configured QoS parameters exceeds a limit.

7. The system of claim 6 wherein the limit is the maximum bandwidth associated with the access element.

8. The system of claim 6 wherein the limit is a configurable maximum bandwidth limit.

9. The system of claim 6 wherein the limit is a maximum number of sessions.

10. The system of claim 1 further comprising a session initiation protocol (SIP) server including an application layer authentication mechanism;

and wherein the central control element is operative to maintain security states for remote client elements detected by the access elements, apply, at the access elements, a security mechanism to control access to the wireless connections to remote client elements, wherein operation of the security mechanism is based on the security states of the remote client elements, and adjust the security state associated with a remote client element based on its interaction with the authentication mechanism associated with the SIP server.

11. The system of claim 10 wherein the central control element is operative to deny connections with an access element to a wireless client element that fails to properly authenticate with the authentication mechanism of the SIP server.

12. A method for dynamically configuring a QoS mechanism for wireless sessions, comprising receiving, at a wireless network access device, a session initiation message associated with a wireless client remote from the wireless network access device, the session initiation message corresponding to an application layer session between the wireless client and an end system;

transparently processing the session initiation message to determine a Quality-of-Service (QoS) parameter, wherein the QoS defines an allocation of wireless bandwidth resources provided by the wireless network access device, associating the QoS parameter to the session corresponding to the session initiation message, forwarding the session initiation message to a session initiation protocol server for processing; and enforcing, at the wireless network access device, the QoS parameter on data flows associated with the application layer session by reserving wireless bandwidth for the application layer session according to the allocation of wireless bandwidth resources.

13. The method of claim 12 further comprising monitoring for a response to the session initiation message forwarded to the session initiation protocol server; and deallocating the wireless bandwidth reserved for the application layer session, if the response rejects the application layer session.

14. The method of claim 12 further comprising storing, responsive to detection of the session initiation message, the session initiation message forwarded to the session initiation protocol server;

monitoring for a response accepting the application layer session corresponding to the session initiation message forwarded to the session initiation protocol server;

and wherein the enforcing the QoS parameter is conditioned on the response accepting the session initiation message.

15. The system of claim 1 wherein the central control element is operative to monitor for a response to the session initiation message forwarded to the session initiation protocol server;

transmit, if the response rejects the application layer session corresponding to the session initiation message, control signals to cause the first access element to discard the QoS parameters transmitted by the central control element in response to the session initiation message.

16. The system of claim 1 wherein the central control element is operative to store, responsive to detection of the session initiation message, the session initiation message forwarded to the session initiation protocol server;

monitor for a response accepting the application layer session corresponding to the session initiation message forwarded to the session initiation protocol server;

and wherein transmission of the one or more QoS parameters to the first access element is conditioned on the response accepting the session initiation message.

* * * * *

UNITED STATES PATENT AND TRADEMARK OFFICE
CERTIFICATE OF CORRECTION

PATENT NO.        : 7,643,442 B1                                      Page 1 of 1
APPLICATION NO. : 10/611521
DATED             : January 5, 2010
INVENTOR(S)       : Patrice R. Calhoun It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1880 days.

Signed and Sealed this

Sixteenth Day of November, 2010

David J. Kappos
*Director of the United States Patent and Trademark Office*